Dec. 13, 1966    B. C. CRANAGE    3,291,442
GAS OR VACUUM-OPERATED COUPLINGS
Filed July 27, 1964    2 Sheets-Sheet 1
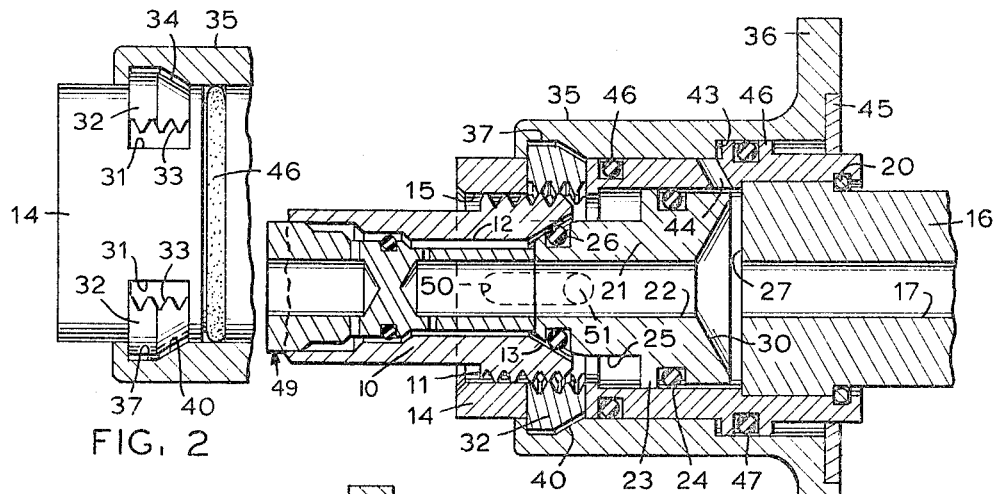
FIG. 2
FIG. 1
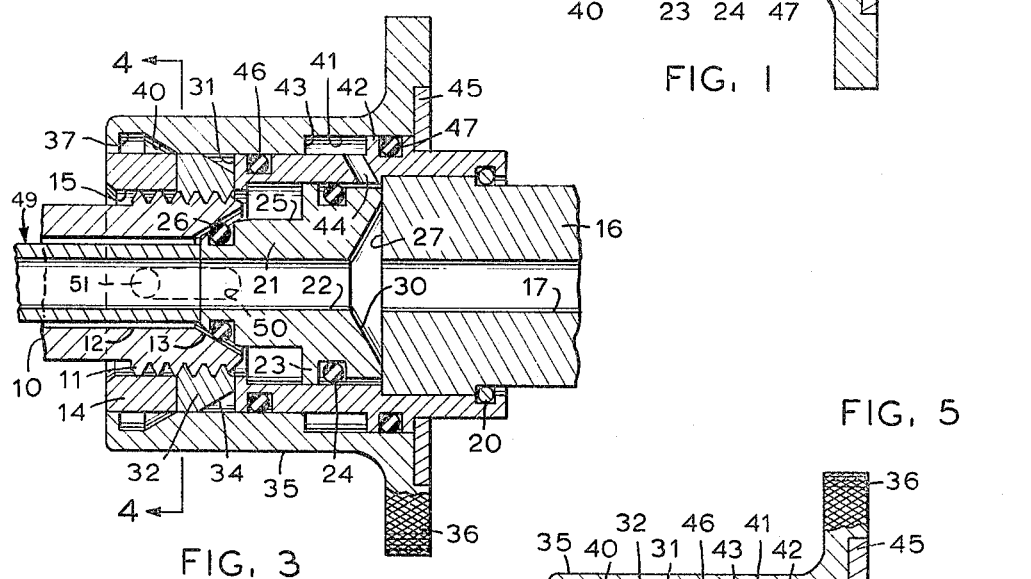
FIG. 3
FIG. 5
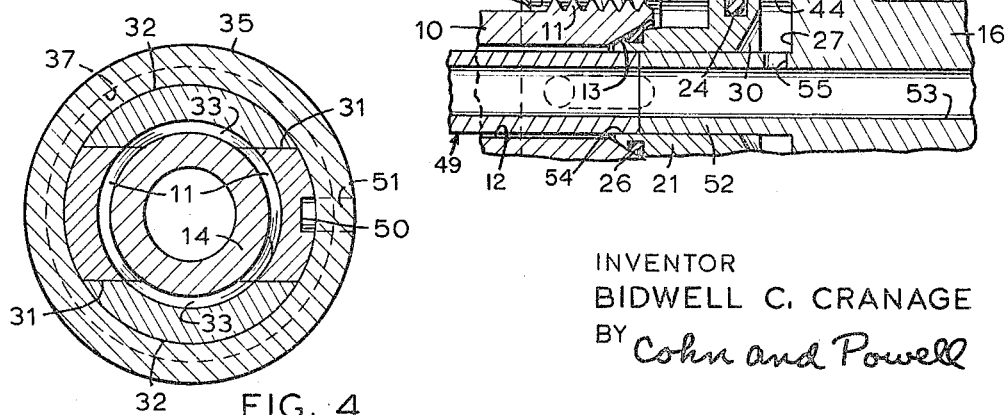
FIG. 4
INVENTOR
BIDWELL C. CRANAGE
BY Cohn and Powell
ATTORNEYS Dec. 13, 1966  B. C. CRANAGE  3,291,442
GAS OR VACUUM-OPERATED COUPLINGS
Filed July 27, 1964  2 Sheets-Sheet 2

INVENTOR
BIDWELL C. CRANAGE
BY
Cohn and Powell
ATTORNEYS

United States Patent Office 3,291,442
Patented Dec. 13, 1966

3,291,442
GAS OR VACUUM-OPERATED COUPLINGS
Bidwell C. Cranage, Ferguson, Mo., assignor to Stile-Craft Manufacturers, Inc., St. Louis, Mo., a corporation of Missouri
Filed July 27, 1964, Ser. No. 385,276
3 Claims. (Cl. 251—149.1)

This invention relates generally to improvements in a coupling, and more particularly to improvements in a gas or vacuum operated coupling that can be quickly and easily connected or disconnected.

In laboratory or hospital use, it has become prevalent or standard for gas and/or vacuum outlet stations to utilize a tubular nipple having external threads. The size and shape of the nipple varies depending upon whether it is adapted for gas or vacuum and depending on the specific gas dispensed. Heretofore, equipment was operatively connected to the threaded nipple by a plug that engaged the nipple and which was held sealingly in assembly by a nut that threadedly engaged the nipple threads. This type of threaded coupling assembly took considerable time and effort to install or remove. It is an important object of the present invention to provide a quick-connect-disconnect coupling to be used in association with the threaded nipple, such coupling being a type that can be merely pushed over and on the nipple for an effective connection and seal, and as readily disconnected by a simple pulling action.

An important object is achieved by the provision of a sleeve slidably mounted on the body and selectively movable to a locking position to urge a latch means into locking engagement with the nipple, the sleeve having a surface subjected to the pressure in the flow passage through the nipple and sealing plug which tends to move the sleeve to the locking position and hence maintain the nipple latched.

Another important object is realized in that the plug fits within the nipple, and a resilient annular sealing element carried by the plug engages on interior sealing surface of the nipple when the coupling is attached to the nipple.

Yet another important objective is attained by the provision of exterior threads on the nipple to which the locking members connect under the camming action of the sleeve upon movement to the locking position under the influence of flow pressure.

An important object is provided by the structural arrangement of the component parts of the coupling so that the sleeve is actuated automatically to the locking position under the influence of either a gas or a vacuum pressure in the flow passage when the coupling body is pushed on the nipple.

Another important objective is afforded by movably mounting a tubular plug in the body socket which is adapted to engage the nipple sealingly upon insertion of the nipple into the body socket, the movable plug having a surface subjected to the pressure in the flow passage which tends to move and maintain the plug in sealing engagement with the nipple.

Still another important object is achieved by the construction that subjects both the actuating sleeve and the movable plug to the flow pressure, whereby the pressure tends to urge the sleeve to the locking position and tends to maintain the nipple latched, and, in addition, tends to urge the plug into sealing relation with the nipple and tends to maintain such seal.

An important objective is realized by the provision of a tubular stem extending into the socket on which the tubular plug is slidably mounted, the stem acting to open a poppet valve in the nipple rather than having the plug open such poppet valve, so that the pressure required to open the poppet valve is not transmitted to the plug in opposition to the pressure tending to move the plug into sealing relation with the nipple.

Another important objective is to provide a quick-connect coupling of this type that is simple and durable in construction, economical to manufacture and assemble, highly efficient in operation, and which can be readily utilized by anyone with little or no instruction.

The foregoing and numerous other objects and advantages of the invention will more clearly appear from the following detailed description of modified embodiments thereof, particularly when considered in connection with the accompanying drawings, in which:

FIG. 1 is a cross sectional view of a gas-operated coupling as seen along a plane passed through the longitudinal axis, the actuating sleeve being disposed in the unlocking position;

FIG. 2 is a fragmentay side elevational view of the front end of the body, with the sleeve shown in section, to illustrate more clearly the latch mechanism;

FIG. 3 is a cross sectional view similar to FIG. 1, but showing the sleeve moved to the locking position;

FIG. 4 is a cross sectional view as seen along line 4—4 of FIG. 3.

FIG. 5 is a fragmentary cross sectional view similar to FIG. 3 but illustrating a modification of the gas-operated coupling in which the movable plug is mounted on a tubular body stem;

Figure 6:
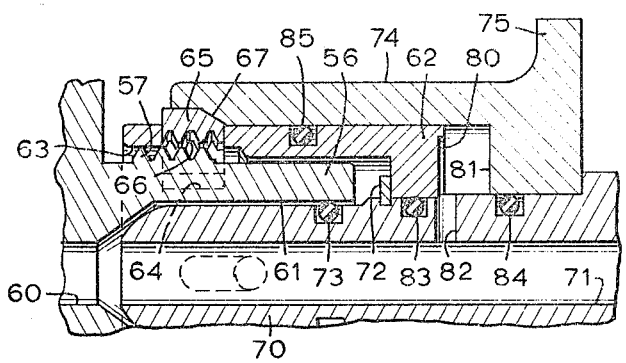
FIG. 6 is a fragmentary cross sectional view of a vacuum-operated coupling, with the sleeve disposed in the unlocking position.

Referring now by characters of reference to the drawings, and first to FIGS. 1 through 4, a gas-operated coupling is disclosed. Actually, the embodiment of FIGS. 1–4 discloses a coupling that is specifically adapted for use in an oxygen line.

The coupling includes a tubular nipple 10 having external threads 11 and having a longitudinal bore 12. The end of nipple 10 is provided with an inwardly tapered and internal annular pressure surface 13.

A cylindrical body 14 is open at one end to provide a socket 15 adapted to receive and fit the nipple 10. The opposite end of body 14 is attached to a rearwardly extending tubular fitting 16 having a longitudinal bore 17 therethrough. The fitting 16 is retained to the body 14 by a retaining ring 20. The fitting 16 defines the rear of body socket 15.

Reciprocatively mounted in the body socket 15 is a tubular plug 21 having a longitudinal bore 22. The movable plug 21 includes an enlarged cylindrical head portion 23 that approximates the internal diameter of body socket 15 and slidably mounts the plug 21 in the body 14 for reciprocative movement. An O-ring 24 is carried by the head portion 23 and provides an effective seal between the plug 21 and the body 14.

The forwardly extending, relatively reduced front portion 25 of the plug 21 is adapted to fit within the nipple bore 12 for a short distance when the nipple 10 is inserted into the body socket 15. An O-ring 26 constituting a resilient annular sealing element, is carried by the front plug portion 25 and is adapted to engage sealingly the tapered internal nipple surface 13 in order to provide a flow passage through the bores 12 and 22 of the nipple 10 and plug 21 respectively.

Between the back side of the plug 21 and the body fitting 16 is a chamber 27 that is in direct communication with the flow passage. The chamber 27 is partially defined by an inclined, annular pressure surface 30 formed on the plug 21. The plug surface 30 is subjected to the pressure in the flow passage and the plug 21 is urged forwardly under the influence of such pressure so that the O-ring 26 seals tightly against the nipple sealing surface 13.

The area of contact of O-ring 26 mounted on the tubular plug 21 is sufficiently smaller than the area of contact of O-ring 44 in sleeve 14 such that gas pressure differential on these two areas will tend to move tubular plug 21 in a direction to press O-ring 26 tightly against the sealing surface 13. It is seen that the plug 21 is thereby self-sealing.

The latch means is perhaps best illustrated in FIG. 2. It is seen that the body 14 is provided with a pair of diametrically opposed openings 31 in which a pair of locking members 32 are carried. These locking members 32 can move freely, yet selectively, into and out of the body socket 15 in a radial direction. Each locking member 32 includes a plurality of teeth 33 adapted to engage and mesh with the nipple threads 11 when the nipple 10 is inserted and the locking members 32 are moved inwardly into the body socket 15. Each locking member 32 is provided with an inclined cam surface 34 along its outside periphery, the purpose and function of the cam surface 34 becoming more apparent upon later description of parts.

Reciprocatively mounted on the body 14 is a sleeve 35. An integral annular flange 36 is provided at the rear of sleeve 35, the flange 36 constituting a gripping area to facilitate the installation or removal of the coupling.

The sleeve 35 is movable to an unlocking position illustrated in FIG. 1 in which a front annular recess 37 is aligned laterally with the locking members 32, the recess 37 being adapted to receive the locking members 32 as they move radially out of the body socket 15. The sleeve recess 37 is partially defined by a cam surface 40 adapted to engage the locking members 32 when the sleeve 35 is moved forwardly toward a locking position shown in FIG. 3 in which the locking members 32 are urged inwardly of the body socket 15 and into engagement with the nipple threads 11.

As is shown best in FIG. 3, a chamber 41 is provided between the sleeve 35 and an annular projection 42 on body 14. This chamber 41 is partially defined by a pressure surface 43 formed on the sleeve 35. A duct 44 is formed in the body 14 and places the chamber 27 at the rear of plug 21 in direct communication with the chamber 41, and consequently subjects the sleeve surface 43 to the pressure in the flow passage. This pressure tends to urge the sleeve 35 forwardly to the locking position illustrated in FIG. 3, and hence tends to maintain the nipple 10 latched.

The forward movement of the sleeve 35 is limited by engagement of a washer 45 fixed to the sleeve 35 with the annular body projection 42.

An O-ring 46 carried by body 14 engages the sleeve 35 forwardly of the pressure chamber 41 and causes an effective seal between the body 14 and sleeve 35 at this point. Another O-ring 47 is carried by the body projection 42 and engages the sleeve 35 rearwardly of the pressure chamber 41 to provide an effective seal between the body 14 and sleeve 35 at this point.

A guide means is provided to constrain the sleeve 35 to reciprocative movement between the unlocking and locking positions without any rotative movement relative to body 14. This guide means includes an elongate groove 50 formed longitudinally along the exterior surface of body 14, the groove 50 being adapted to receive slidably a coacting pin 51 carried by the sleeve 35.

It will be assumed that it is desirable to attach the coupling to the threaded nipple 10. The sleeve 35 is moved to its unlocking position illustrated in FIG. 1 so that the locking members 32 can move out of the body socket 15 and into the sleeve recess 37. To attach the parts, the coupling is located with the body socket 15 aligned with the nipple 10 and the coupling is simply pushed onto such nipple 10.

As the nipple 10 is inserted, the locking members 32 will ride over the nipple threads 11, and the O-ring 26 carried by the movable plug 21 will effectively engage the nipple sealing surface 13. Upon such insertion, the front end of the plug 21 will open a poppet valve 49 within the nipple 10 and a flow passage through the nipple 10 and the plug 21 is created. The pressure of the gas moving through the flow passage is subjected to the plug surface 30 and tends to move the plug 21 forwardly into tight sealing relation with the nipple 10. The area at the back of the plug 21 is greater than the area of sealing at the front. Consequently, the resulting differential pressure will urge the plug 21 forwardly into more intimate contact and tighter seal.

Simultaneously, the sleeve surface 43 is subjected to the pressure of the flow passage through the intervening duct 44 so that such pressure tends to move the sleeve 35 forwardly from the unlocking position illustrated in FIG. 1 to the locking position illustrated in FIG. 3. As the sleeve 35 moves forwardly, the camming surface 40 of the sleeve 35 engages the camming surface 34 of the locking members 32 and urges the locking members 32 into the body socket and into latching engagement with the nipple 10. More particularly, the teeth 33 of the locking members 32 mesh with the nipple threads 11 to hold the nipple 10 securely. Because the sleeve 35 is maintained in the locking position under the influence of the pressure in the flow passage, it will be understood that this pressure also tends to maintain the nipple 10 latched.

To disconnect the coupling from the nipple 10, the sleeve flange 36 is gripped digitally and moved rearwardly against the loading created by the pressure in the flow passage subjected to the sleeve surface 43. As the sleeve 35 is moved rearwardly from the locking position of FIG. 3 to the unlocking position of FIG. 1, the sleeve recess 37 is aligned with the locking members 32 so as to receive the locking members 32 as they move radially out of the body socket 15. When the teeth 33 of the locking members 32 operatively disengage from the nipple threads 11, the nipple 10 is withdrawn from the body socket 15 upon continued pulling action on the sleeve flange 36. Of course, as the nipple 10 is withdrawn, the seal with the movable plug 21 is broken.

FIG. 5 discloses a modification of the gas-operated coupling disclosed in FIGS. 1 and 4 and described previously. In this modification, the corresponding component parts are given the identical reference wherever possible. However, the distinguishing features and structures will be described in detail.

For example, the body fitting 16 includes a forwardly extending and relatively reduced tubular stem 52 having a longitudinal bore 53 therethrough. The movable plug 21 has a slightly larger bore 54 than that provided in the embodiment of FIGS. 1–4, so as to accommodate and slidably receive the stem 52. The stem 52 is provided with a duct 55 that places the flow passage constituted by the nipple bore 12 and the stem bore 53 in direct communication with the pressure chamber 27 at the rear of plug 21.

The operation and functional advantages of the coupling disclosed in FIG. 5 is substantially the same as that previously described with respect to the coupling of FIGS. 1–4 with but one distinction. Briefly, when the coupling is pushed on the nipple 10, the forward end of the stem 52 will engage the poppet valve 49 within the nipple 10 to open the poppet valve and cause a gas flow. The O-ring 26 carried by the movable plug 21 engages the interior sealing surface 13 of nipple 10. The pressure of the flow passage is transmitted to the chamber 27 through duct 55. The pressure surface 30 of the movable plug 21 is subjected to this pressure and tends to move the plug 21 forwardly into tight seal with the nipple 10. Because the end of the stem 52 opens the nipple poppet valve, the force required to open such poppet valve is not transmitted to the plug 21 in opposition to the pressure tending to move the plug 21 toward the sealing position. Thus, the pressure of the flow passage acts more efficiently in moving the plug 21 forwardly to the sealing position.

In the embodiment of FIG. 5 the contact area of O-ring 26 is smaller than the contact area of O-ring 44 so that the pressure differential will urge the plug 21 forwardly into a tighter seal with the surface 13.

Figure 7:
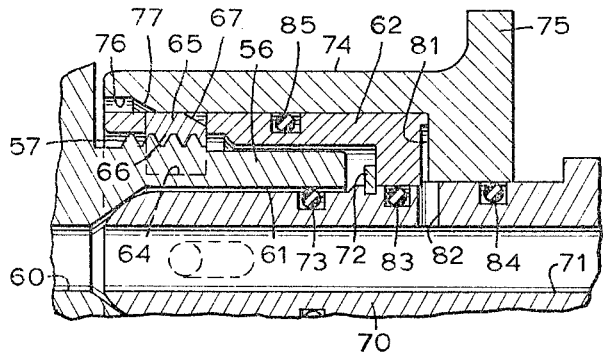
FIG. 7 is a cross sectional view similar to FIG. 6, but showing the sleeve moved to the locking position.

FIGS. 6 and 7 disclose a somewhat similar quick-connect coupling, but designed so as to operate on a vacuum created in the nipple.

This vacuum-operated coupling includes a tubular nipple 56 having external threads 57 and having a longitudinal bore 60 therethrough. The interior sealing surface 61 is substantially cylindrical in this embodiment.

The coupling body 62 is open at one end to provide a socket 63 adapted to receive the nipple 56. Similar to the embodiments of FIGS. 1–5, the body 62 includes a pair of openings 64 (only one of which is shown in FIGS. 6 and 7) adapted to receive a pair of locking member 65. Each locking member is provided with teeth 66 adapted to engage and mesh with the nipple threads 57 when the locking members are moved into the body socket 63. In addition, each locking member 65 includes a cam surface 67.

Fastened to the body 62 is a tubular plug 70 having a longitudinal bore 71 therethrough. A retaining ring 72 holds the plug 70 in place. The plug 70 extends forwardly into the body socket 63 and is adapted to be received in the nipple 56. An O-ring 73 is carried by the plug 70 and is adapted to engage the sealing surface 61 of nipple 56 and thereby provides a flow passage through the nipple 56 and plug 70.

Reciprocatively mounted on body 62 is a sleeve 74. An annular flange 75 is provided at the rear of sleeve 74 to facilitate gripping. The front end of sleeve 74 is provided with an annular recess 76, best shown in FIG. 7, into which the locking members 65 can move when the sleeve 74 is located in the unlocking position illustrated in FIG. 6. The recess 76 is partially defined by a camming surface 77 that coacts with the camming surfaces 67 of the locking members 65 upon movement of the sleeve 74 from the unlocking position of FIG. 6 to the locking position of FIG. 7, whereby to urge the locking members 65 into the body socket 63 and into latching engagement with the nipple threads 57.

Formed between the body 62 and the sleeve 74 is a pressure chamber 80 that is partially defined by a pressure surface 81 on the sleeve 74. This chamber 80 is placed in communication with the flow passage by a duct 82 formed in the side of plug 70. It will be understood that when a vacuum is formed in the flow passage, such vacuum pressure is exerted on the sleeve surface 81 and tends to move the sleeve 74 forwardly from the unlocking position of FIG. 6 to the locking position of FIG. 7.

An O-ring 83 is carried by the plug 70 and engages the body 62 ahead of the pressure chamber 80 and duct 82 to provide an effective seal therebetween. Another O-ring 84 is carried by the plug 70 and engages the sleeve 74 behind the pressure chamber 80 to provide an effective seal therebetween. Still another O-ring 85 is carried by the body 62 and engages the sleeve 74 forwardly of the pressure chamber 80 to provide an effective seal therebetween.

To attach the coupling to the nipple 56, the coupling is simply pushed onto such nipple 56. It will be understood that the sleeve 74 is initially located in the unlocking position illustrated in FIG. 6. As the nipple 56 enters the body socket 63, the locking members 65 will be urged outwardly into the sleeve recess 76. The O-ring 73 carried by the plug 70 will engage the interior sealing surface 61 of the nipple 56, and a vacuum will be formed in the passage provided by the nipple bore 60 and the plug bore 71. This vacuum pressure is exerted directly on the sleeve surface 81 through the interconnecting plug duct 82, the vacuum pressure causing the sleeve 74 to move forwardly from the unlocking position of FIG. 6 to the locking position of FIG. 7. As the sleeve 74 moves forwardly, the sleeve 74 cams the locking members 65 inwardly so that the teeth 66 mesh with the nipple threads 57 to provide a secure attachment of the nipple 56 with the body 62. Because the vacuum pressure tends to hold the sleeve 74 in the locking position of FIG. 7, it is clear that such pressure, consequently, tends to maintain the nipple 56 latched.

To disengage the coupling, the sleeve flange 75 is gripped and pulled backwardly against the vacuum pressure exerted on the sleeve surface 81. When the sleeve 74 is moved to the unlocking position of FIG. 6, the locking members 65 can move out of the body socket 63 and out of meshing engagement with the nipple threads 57, whereby to release the nipple 56. Upon continued pulling action exerted on the coupling, the plug 70 is withdrawn from the nipple 56 and the nipple 56 is withdrawn from the body socket 63.

Figure 8:
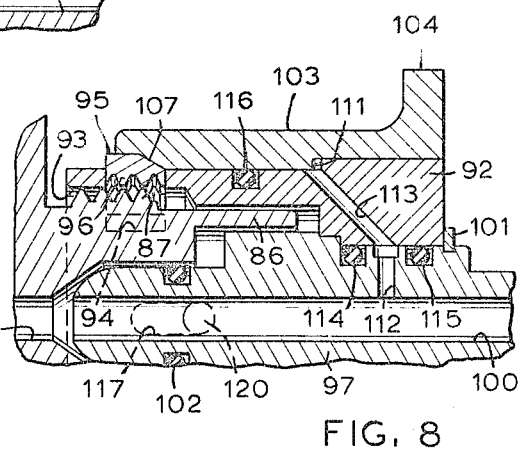
FIG. 8 is a fragmentary cross sectional view of another gas-operated coupling, the sleeve being disposed in the unlocking position.
Figure 9:
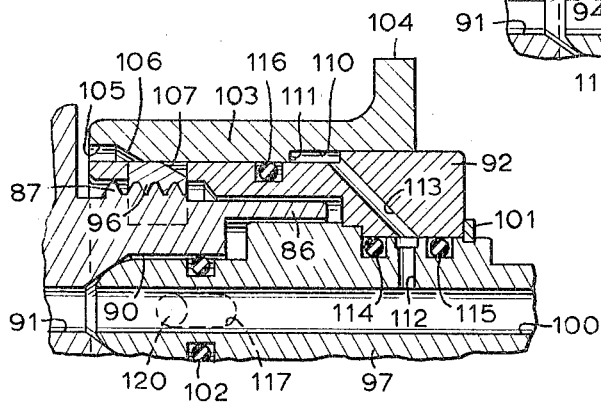
FIG. 9 is a fragmentary cross sectional view similar to FIG. 8, but showing the sleeve moved to the locking position.

Another embodiment is disclosed in FIGS. 8 and 9. This embodiment is adapted to be utilized for another gas such as nitrous oxide. It will be understood that in each of these embodiments, the respective nipples have different dimensions and shape relationships so that the couplings will under all circumstances be capable of operative connection only to the nipples to which they are correctly associated. For example, the oxygen-operated coupling can be only operatively connected to that nipple dispensing oxygen, while the nitrous oxide-operated coupling can be only connected operatively to that nipple dispensing nitrous oxide, and the vacuum-operated coupling only be connected operatively to that nipple associated in a vacuum line.

In the embodiment of FIGS. 8–9, the tubular nipple 86 includes external threads 87 and an interior substantially cylindrical sealing surface 90. The nipple 86 is provided with a bore 91 therethrough, the bore 91 having a particular stepped formation so as to receive a plug having a compatible shape.

The coupling body 92 is open at one end to provide a socket 93 adapted to receive the nipple 86. Similar to the other previously described embodiments, the body 92 is provided with a pair of diametrically opposed openings 94 that hold a pair of locking members 95. The locking members include teeth 96 that mesh with the nipple threads 87 when the locking members 95 are moved into the body socket 93.

A tubular plug 97 includes a longitudinal bore 100 therethrough. The plug 97 is attached to the rear of body 92 and is retained by ring 101. The plug 97 extends forwardly into the body socket 93 and is provided with a step formation that conforms to the internal step formation in the nipple 86 so that the plug 97 can be received in such nipple 86 when the nipple 86 is inserted in the body socket 93. An O-ring 102 is carried by the forward end of the plug 97 and engages the internal sealing surface 90 to provide an effective seal between the plug 97 and the nipple 86 and thereby provides a flow passage through the nipple 86 and plug 97.

Reciprocatively mounted on the body 92 is a sleeve 103 that is selectively movable to either the unlocking position of FIG. 8 or to the locking position of FIG. 9. This sleeve 103 is provided with an integral annular flange 104 at the rear that can be conveniently gripped for manually moving the sleeve 103. The forward end of the sleeve 103 is provided with an annular recess 105 into which the locking members 95 can move when the sleeve 103 is located in the unlocking position of FIG. 8. This recess 105 includes a camming surface 106 that engages cooperating cam surfaces on the locking members 95 when the sleeve 103 is moved from the unlocking position of FIG. 8 to the locking position of FIG. 9, thereby causing the locking members 95 to move into the body socket 93 and the locking member teeth 96 to move into meshing engagement with the nipple threads 87.

Formed between the body 92 and the sleeve 103 is a chamber 110 that is partially defined by a pressure surface 111 on sleeve 103. This chamber 110 is placed in direct communication with the flow passage through the plug bore 100 by interconnected ducts 112 and 113 formed respectively in the plug 97 and body 92. The pressure of the flow passage is thereby exerted directly on the sleeve surface 111 and tends to move the sleeve 103 forwardly to the locking position shown in FIG. 9.

A pair of O-rings 114 and 115 are carried by the plug 97 on opposite sides of the duct 112 and engage the body 92 on opposite sides of the associated duct 113 to provide an effective seal between the plug 97 and body 92. Another O-ring 116 is carried by the body 92 and engages the sleeve 103 ahead of the pressure chamber 110, and thereby provides an effective seal between the body 92 and the sleeve 103.

Similar to the embodiment of FIGS. 1–4, the embodiment of FIGS. 8–9 include a guide means to constrain the sleeve 103 to reciprocative movement without any rotative movement relative to body 92. This guide means includes a longitudinal groove 117 formed in the body 92 and a coacting pin 120 carried by the sleeve 103 and slidably interfitting the groove 117.

To attach the coupling to the nipple 86 dispensing nitrous oxide, the coupling is simply pushed on the nipple 86. It will be assumed that the sleeve 103 is located initially in the unlocking position illustrated in FIG. 8.

As the nipple 86 moves into the body socket 93, the locking members 95 ride over the nipple threads 87 and move into the sleeve recess 105, while the plug 97 moves into the nipple bore 91. At some point of this insertion, the O-ring 102 carried by the plug 97 engages the internal sealing surface 90 of the nipple 86 to provide a flow passage through the nipple and plug for the nitrous oxide. The pressure in the flow passage is exerted on the sleeve surface 111 through the interconnected ducts 112 and 113, thereby ending to urge the sleeve 103 forwardly from the unlocking position of FIG. 8 to the locking position of FIG. 9. As the sleeve 103 moves forwardly under this Gas pressure, the camming surface 106 engages the coacting camming surfaces 107 on the locking members 95 and urges such locking members 95 into the body socket 93 so that the locking member teeth 96 mesh with the nipple threads 87 to provide an effective latching between the nipple 86 and the body 92 to preclude withdrawal of such nipple 86. It is seen that attachment is accomplished by a simple pushing action.

To disconnect the coupling, the sleeve flange 104 is pulled rearwardly to move the sleeve 103 to the unlocking position of FIG. 8 against the pressure of the gas in the flow passage. When the sleeve 103 is located in the unlocking position, the locking members 95 can move outwardly into the annular recess 105, and the nipple 86 is removed from the body socket 93 upon continued pulling on the sleeve flange 104.

It will be noted that the teeth 33 of the locking members 32 may be misaligned slightly relative to the threads 11 of nipple 10 when the nipple 10 is inserted and the sleeve 35 is moved forwardly to the locking position. To assure positive meshing, the body 14 may be backed off slightly or pushed on further until the teeth 33 of the locking members 32 effectively engage the threads 11. However, the threads 11 may be unintentionally misaligned a partial turn relative to the locking member teeth 33 to preclude effective engagement. In such case, the sleeve 35 is rotated slightly to turn the body 14 through the pin 51 and slot 50 connection, whereby to bring the locking member teeth 33 into alignment with the threads for locking engagement.

Although the invention has been described by making detailed reference to several embodiments, such detail is to be understood in an instructive, rather than in any restrictive sense, many variants being possible within the scope of the claims hereunto appended.

I claim as my invention:

1. In a coupling:
   (a) a tubular nipple,
   (b) a tubular body providing a socket adapted to receive the nipple,
   (c) latch means carried by the body,
   (d) a sleeve slidably mounted on and externally of the body and selectively movable to a locking position to urge the latch means into locking engagement with the nipple,
   (e) a tubular plug having a sealing surface thereon, said tubular plug being slidably mounted in the body and extending into the socket, said sealing surface engaging the nipple sealingly upon insertion of the nipple, whereby to provide a flow passage through the nipple and plug, said tubular plug having a pressure surface upon which the line pressure fluid acts to maintain said sealing surface of said plug in sealing engagement wtih said nipple,
   (f) the sleeve and body having a fluid tight chamber therebetween externally of the body,
   (g) means placing the chamber externally of the body in communication with the flow passage internally of the body, and
   (h) the external sleeve including a surface partially defining the chamber externally of the body which is subjected to the pressure of the fluid in the flow passage tending to move the external sleeve to the locking position and to maintain the nipple latched.

2. In a coupling:
   (a) a tubular nipple,
   (b) a tubular body providing a socket adapted to receive the nipple,
   (c) latch means carried by the body,
   (d) a sleeve slidably mounted on and externally of the body and selectively movable to a locking position to urge the latch means into locking engagement with the nipple,
   (e) the sleeve and body defining a fluid tight chamber therebetween, said sleeve including a pressure surface partially defining said chamber externally of the body and socket,
   (f) a tubular plug movably mounted in the socket free of the latch means and external sleeve and movable to a position to engage the nipple sealingly upon insertion of the nipple with a first sealing surface, the nipple and tubular plug providing a flow passage therethrough,
   (g) the plug and body having a second chamber therebetween and internally of the body,
   (h) the plug including a second sealing surface partially defining the second chamber, the second chamber being in communication with the flow passage so as to subject the second sealing surface of the plug to the pressure of the fluid in the flow passage, the second sealing surface having a larger area of contact than the first sealing surface so that the pressure differential tends to move the plug to the sealing position, and
   (i) duct means in the body communicating the second chamber internally of the body with the sleeve pressure surface externally of the body so as to subject the sleeve surface to the pressure of the fluid in the flow passage tending to move the sleeve to the locking position.

3. In a coupling:
   (a) a tubular nipple having an internal valve means, (b) a tubular body providing a socket adapted to receive the nipple,
(c) latch means carried by the body,
(d) a sleeve slidably mounted on and externally of the body and selectively movable to a locking position to urge the latch means into locking engagement with the nipple,
(e) the body including a tubular stem extending into the socket and engaging the valve means upon insertion of the nipple, said valve means being opened by the engagement of the tubular stem therewith,
(f) a tubular plug slidably mounted on the body stem free of the latch means and external sleeve and movable to a position to engage the nipple sealingly upon insertion of the nipple with a first sealing surface, the nipple and the tubular stem providing a flow passage therethrough,
(g) the movable plug, body and body stem providing a chamber therebetween, the plug including a second sealing surface partially defining the chamber,
(h) a duct in the body stem placing the chamber in communication with the flow passage so as to subject the second sealing surface of the plug to the pressure of the fluid in the flow passage, the second sealing surface having a larger area of contact than the first sealing surface so that the pressure differential tends to move the plug to the sealing position,
(i) the sleeve and body defining a fluid tight second chamber therebetween, said sleeve including a pressure surface partially defining said second chamber externally of the body, and
(j) a duct in the body placing the second chamber in communication with the chamber so as to subject the sleeve pressure surface to the pressure of the fluid in the flow passage tending to move the sleeve to the locking position.

References Cited by the Examiner

UNITED STATES PATENTS

| | | | |
|---|---|---|---|
| 1,500,531 | 7/1924 | Schweinert et al. | 285—34 |
| 1,848,538 | 3/1932 | Mudd | 285—315 X |
| 2,061,062 | 11/1936 | Davis et al. | 285—306 X |
| 2,327,714 | 8/1943 | Iftiger | 285—35 |
| 2,578,517 | 12/1951 | Davis | 285—306 |
| 2,705,159 | 3/1955 | Pfau | 285—315 X |
| 2,837,352 | 6/1958 | Wurzburger | 285—277 X |
| 2,921,436 | 1/1960 | Canner. | |

FOREIGN PATENTS 985,539   3/1951   France.

CARL W. TOMLIN, *Primary Examiner.*

D. W. AROLA, *Assistant Examiner.*